US011121981B1

(12) United States Patent
Ping et al.

(10) Patent No.: US 11,121,981 B1
(45) Date of Patent: Sep. 14, 2021

(54) OPTIMISTICALLY GRANTING PERMISSION TO HOST COMPUTING RESOURCES

(71) Applicant: Amazon Technologies, Inc., Seattle, WA (US)

(72) Inventors: Fan Ping, Kenmore, WA (US); Sriram Venugopal, Issaquah, WA (US); Avram Israel Blaszka, Seattle, WA (US); Divya Ashokkumar Jain, Issaquah, WA (US); James Pinkerton, Sammamish, WA (US); Jianhua Fan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

(21) Appl. No.: 16/024,026

(22) Filed: Jun. 29, 2018

(51) Int. Cl.
| | |
|---|---|
| G06F 15/173 | (2006.01) |
| H04L 12/911 | (2013.01) |
| H04L 29/08 | (2006.01) |
| G06F 9/455 | (2018.01) |
| G06F 9/50 | (2006.01) |
| H04L 29/06 | (2006.01) |

(52) U.S. Cl.
CPC ........ H04L 47/783 (2013.01); G06F 9/45558 (2013.01); G06F 9/5077 (2013.01); H04L 63/10 (2013.01); H04L 67/1008 (2013.01); H04L 67/1031 (2013.01)

(58) Field of Classification Search
CPC ... H04L 47/783; H04L 63/10; H04L 67/1008; H04L 67/1031; G06F 9/45558; G06F 9/5077

USPC ................. 709/225–227, 217, 203, 208, 223
See application file for complete search history.

(56) References Cited

U.S. PATENT DOCUMENTS

| | | | |
|---|---|---|---|
| 5,574,878 | A | 11/1996 | Onodera et al. |
| 6,463,509 | B1 | 10/2002 | Teoman et al. |
| 6,760,899 | B1 | 7/2004 | Young et al. |
| 7,072,815 | B1 | 7/2006 | Chaudhary et al. |
| 7,146,522 | B1 | 12/2006 | Rowe et al. |
| 7,277,960 | B2 | 10/2007 | Andrzejak et al. |

(Continued)

FOREIGN PATENT DOCUMENTS

WO      2011/088261      7/2011

OTHER PUBLICATIONS

Gupta, Rajeev Kumar, and R. K. Pateriya. "Survey on virtual machine placement techniques in cloud computing environment." International Journal on Cloud Computing: Services and Architecture (IJCCSA) 4, No. 4 (2014): 1-7. (Year: 2014).*

(Continued)

*Primary Examiner* — Kaylee J Huang
(74) *Attorney, Agent, or Firm* — Robert C. Kowert; Kowert, Hood, Munyon, Rankin & Goetzel, P.C.

(57) ABSTRACT

A system that hosts computing resources may implement optimistically granting permission to host computing resources. A request for permission to host a computing resource may be received by a control plane. If the control plane determines that the resource host is the first to request permission to host the resource, then the control plane may store an indication of permission that blocks other resource hosts from obtaining permission to host the computing resource and sending an acknowledgement of permission to the resource host that requested permission.

20 Claims, 9 Drawing Sheets

(56) References Cited

U.S. PATENT DOCUMENTS

| | | | |
|---|---|---|---|
| 7,426,570 B2 | 9/2008 | Andrzejak et al. | |
| 7,711,711 B1 | 5/2010 | Linnell et al. | |
| 7,895,261 B2 | 2/2011 | Jones et al. | |
| 7,984,151 B1 | 7/2011 | Raz et al. | |
| 8,037,186 B2* | 10/2011 | Dumitriu | H04L 29/08144 |
| | | | 709/226 |
| 8,219,693 B1 | 7/2012 | Deflaux et al. | |
| 8,280,853 B1 | 10/2012 | Lai et al. | |
| 8,285,687 B2 | 10/2012 | Voll et al. | |
| 8,307,362 B1 | 11/2012 | Gong et al. | |
| 8,365,183 B2 | 1/2013 | Esfahany et al. | |
| 8,452,819 B1 | 5/2013 | Sorenson, III et al. | |
| 8,479,211 B1 | 7/2013 | Marshall et al. | |
| 8,484,353 B1 | 7/2013 | Johnson et al. | |
| 8,533,103 B1 | 9/2013 | Certain et al. | |
| 8,539,197 B1 | 9/2013 | Marshall et al. | |
| 8,583,867 B1 | 11/2013 | Radhakrishnan et al. | |
| 8,612,330 B1 | 12/2013 | Certain et al. | |
| 8,615,579 B1 | 12/2013 | Vincent et al. | |
| 8,615,589 B1 | 12/2013 | Adogla et al. | |
| 8,706,869 B2 | 4/2014 | Campion et al. | |
| 8,762,538 B2 | 6/2014 | Dutta et al. | |
| 8,782,242 B2 | 7/2014 | Ahmad et al. | |
| 8,856,386 B2 | 10/2014 | Dutta et al. | |
| 8,868,963 B2 | 10/2014 | Fawcett | |
| 8,930,539 B1 | 1/2015 | Rajaa | |
| 8,954,592 B1* | 2/2015 | Cormie | H04L 67/1021 |
| | | | 709/229 |
| 9,015,229 B1 | 4/2015 | Raz et al. | |
| 9,020,984 B1 | 4/2015 | Sorenson, III et al. | |
| 9,503,517 B1* | 11/2016 | Brooker | H04L 67/1008 |
| 10,057,187 B1* | 8/2018 | Dhoolam | H04L 47/783 |
| 2002/0059253 A1 | 5/2002 | Albazz et al. | |
| 2003/0191930 A1 | 10/2003 | Viljoen et al. | |
| 2004/0078419 A1 | 4/2004 | Ferrari et al. | |
| 2004/0260873 A1 | 12/2004 | Watanabe | |
| 2005/0015547 A1 | 1/2005 | Yokohata et al. | |
| 2005/0267950 A1 | 12/2005 | Kitamura | |
| 2006/0031649 A1 | 2/2006 | Murotani et al. | |
| 2008/0005468 A1 | 1/2008 | Faibish et al. | |
| 2008/0005508 A1 | 1/2008 | Asano et al. | |
| 2008/0140905 A1 | 6/2008 | Okuyama | |
| 2008/0291204 A1 | 11/2008 | Korupolu et al. | |
| 2009/0132617 A1 | 5/2009 | Soran et al. | |
| 2009/0228535 A1 | 9/2009 | Rathi et al. | |
| 2009/0228889 A1 | 9/2009 | Yoshida | |
| 2009/0235104 A1 | 9/2009 | Fung | |
| 2009/0249470 A1 | 10/2009 | Litvin et al. | |
| 2009/0307426 A1 | 12/2009 | Galloway et al. | |
| 2010/0037009 A1 | 2/2010 | Yano et al. | |
| 2010/0037031 A1 | 2/2010 | DeSantis et al. | |
| 2010/0070725 A1 | 3/2010 | Prahlad et al. | |
| 2010/0077158 A1 | 3/2010 | Asano et al. | |
| 2010/0107015 A1 | 4/2010 | Bernabeu-Auban et al. | |
| 2010/0191922 A1 | 7/2010 | Dickey et al. | |
| 2010/0312983 A1 | 12/2010 | Moon et al. | |
| 2010/0332657 A1 | 12/2010 | Elyashev et al. | |
| 2011/0004735 A1* | 1/2011 | Arroyo | G06F 9/455 |
| | | | 711/162 |
| 2011/0010518 A1 | 1/2011 | Kavuri et al. | |
| 2011/0060885 A1 | 3/2011 | Satoyama et al. | |
| 2011/0072208 A1 | 3/2011 | Gulati et al. | |
| 2011/0078303 A1 | 3/2011 | Li et al. | |
| 2011/0238546 A1 | 9/2011 | Certain et al. | |
| 2011/0246526 A1 | 10/2011 | Finkelstein et al. | |
| 2012/0036249 A1 | 2/2012 | Chandrasekaran | |
| 2012/0036515 A1 | 2/2012 | Heim | |
| 2012/0042142 A1 | 2/2012 | Garman et al. | |
| 2012/0060006 A1 | 3/2012 | Paterson-Jones | |
| 2012/0079221 A1 | 3/2012 | Sivasubramanian et al. | |
| 2012/0084113 A1 | 4/2012 | Brandwine et al. | |
| 2012/0089726 A1 | 4/2012 | Doddavula | |
| 2012/0131176 A1 | 5/2012 | Ferris et al. | |
| 2012/0151476 A1 | 6/2012 | Vincent | |
| 2012/0221710 A1 | 8/2012 | Tsirkin | |
| 2012/0254687 A1 | 10/2012 | Leggette et al. | |
| 2012/0272025 A1 | 10/2012 | Park et al. | |
| 2012/0284712 A1 | 11/2012 | Nimmagadda et al. | |
| 2012/0297238 A1 | 11/2012 | Watson et al. | |
| 2013/0041989 A1 | 2/2013 | Boss et al. | |
| 2013/0046874 A1 | 2/2013 | Cohn | |
| 2013/0046966 A1 | 2/2013 | Chu et al. | |
| 2013/0055277 A1 | 2/2013 | Ashish et al. | |
| 2013/0067267 A1 | 3/2013 | Tamhane et al. | |
| 2013/0091283 A1 | 4/2013 | Omar | |
| 2013/0110778 A1 | 5/2013 | Taylor et al. | |
| 2013/0111032 A1 | 5/2013 | Alapati et al. | |
| 2013/0151683 A1 | 6/2013 | Jain et al. | |
| 2013/0204960 A1 | 8/2013 | Ashok et al. | |
| 2013/0238572 A1 | 9/2013 | Prahlad et al. | |
| 2013/0290539 A1 | 10/2013 | Kodialam et al. | |
| 2013/0290941 A1 | 10/2013 | Kruglick | |
| 2013/0297905 A1 | 11/2013 | Yang et al. | |
| 2013/0311616 A1 | 11/2013 | Wang et al. | |
| 2014/0032767 A1 | 1/2014 | Nelson | |
| 2014/0136729 A1 | 5/2014 | Chan et al. | |
| 2014/0149986 A1 | 5/2014 | S M et al. | |
| 2014/0173229 A1 | 6/2014 | Reohr et al. | |
| 2014/0201364 A1 | 7/2014 | Yoshikawa et al. | |
| 2014/0250440 A1 | 9/2014 | Carter et al. | |
| 2014/0304437 A1 | 10/2014 | Ashok et al. | |
| 2015/0039759 A1* | 2/2015 | Kuo | H04L 67/02 |
| | | | 709/225 |
| 2015/0236977 A1 | 8/2015 | Terayama et al. | |
| 2015/0356078 A1 | 12/2015 | Kishimoto et al. | |
| 2016/0004571 A1 | 1/2016 | Smith | |
| 2016/0269313 A1* | 9/2016 | Brooker | G06F 9/5072 |

OTHER PUBLICATIONS

U.S. Appl. No. 13/465,998, filed May 7, 2012, Marc J. Brooker, et al.
U.S. Appl. No. 13/466,007, filed May 7, 2012, Marc J. Brooker, et al.
U.S. Appl. No. 13/466,010, filed May 7, 2012, Marc J. Brooker, et al.
U.S. Appl. No. 13/466,014, filed May 7, 2012, Marc J. Brooker, et al.
1U.S. Appl. No. 13/466,022, filed May 7, 2012, Marc J. Brooker, et al.
VMware; Carl Waldspurger; Memory Resource Management in WMware ESX Server; pp. 1-24, Dec. 10, 2002.
HP; Chris Hyser et al.; Autonomic Virtual Machine Placement in the Data Center; pp. 1-10, Feb. 26, 2008; HP Laboratories.
U.S. Appl. No. 12/892,742, filed Sep. 28, 2010, Swaminathan Sivasubramanian.
"Amazon EBS API and Command Overview", downloaded Jul. 11, 2013 from doc.aws.amazon.com/AWSEC2/latest/UserGuide/ebs-api-cli-overview.html, p. 1.
"AMI Basics" downloaded Jul. 11, 2013 from doc.aws.amazon.com/AWSEC2/latest/UserGuide/ComponentsAMIs.html, p. 1-2.
"AWS Amazon Elastic Block Store (EBS)—Persistent Storage" downloaded Jul. 11, 2013 from aws.amazon.corn/ebs/, pp. 1-4.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.amazon.com/articles/1667, pp. 1-7.
U.S. Appl. No. 14/028,186, filed Sep. 16, 2013, Marcin Piotr Kowalski.
U.S. Appl. No. 13/424,290, filed Mar. 19, 2012, Marc J. Brooker.
U.S. Appl. No. 14/658,941, filed Mar. 16, 2015, James Michael Thompson.
U.S. Appl. No. 14/643,906, filed Mar. 10, 2015, Christopher Magee Greenwood.
U.S. Appl. No. 14/661,627, filed Mar. 18, 2015, Christopher Magee Greenwood, et al.
U.S. Appl. No. 13/053,469, filed Mar. 22, 2011, James Christopher Sorenson, et al.

(56) References Cited

OTHER PUBLICATIONS

U.S. Appl. No. 13/903,670, filed May 28, 2013, James Christopher Sorenson, et al.

Fetahi Wuhib, et al., "A Gossip Protocol for Dynamic Resource Management in Large Cloud Environments", IEEE Transactions on Network and Service Management, vol. 9, No. 2, Jun. 2012, pp. 213-225.

Hien Nguyen Van, et al., "SLA-aware Virtual Resource Management for Cloud Infrastructures", IEEE Ninth International Conference on Computer and Information Technology, 2009, pp. 357-362.

Fabien Hermenier, et al., "Entropy: a Consolidation Manger for Clusters", VEE'09: Proceeding of the 2009 ACM SIGPLAN/SIGOPS International Conference on Virtual Execution Environment, Mar. 11-13, 2009, pp. 41-50.

Fetahi Wuhib, et al., "Dynamic Resource Allocation with Management Objectives-Implementation for an OpenStack Cloud", KTH Technical Reports, May 28, 2012, pp. 1-8.

U.S. Appl. No. 14/642,445, filed Mar. 9, 2015, Marc John Brooker et al.

\* cited by examiner

OPTIMISTICALLY GRANTING PERMISSION TO HOST COMPUTING RESOURCES

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different placement optimizations and/or constraints may be implemented in order to provide performance guarantees. For example, permissions may be granted to ensure that some volume workflows, such as volume creation, can be performed at multiple locations in order to increase the speed of performing the workflows.

Figure 1:
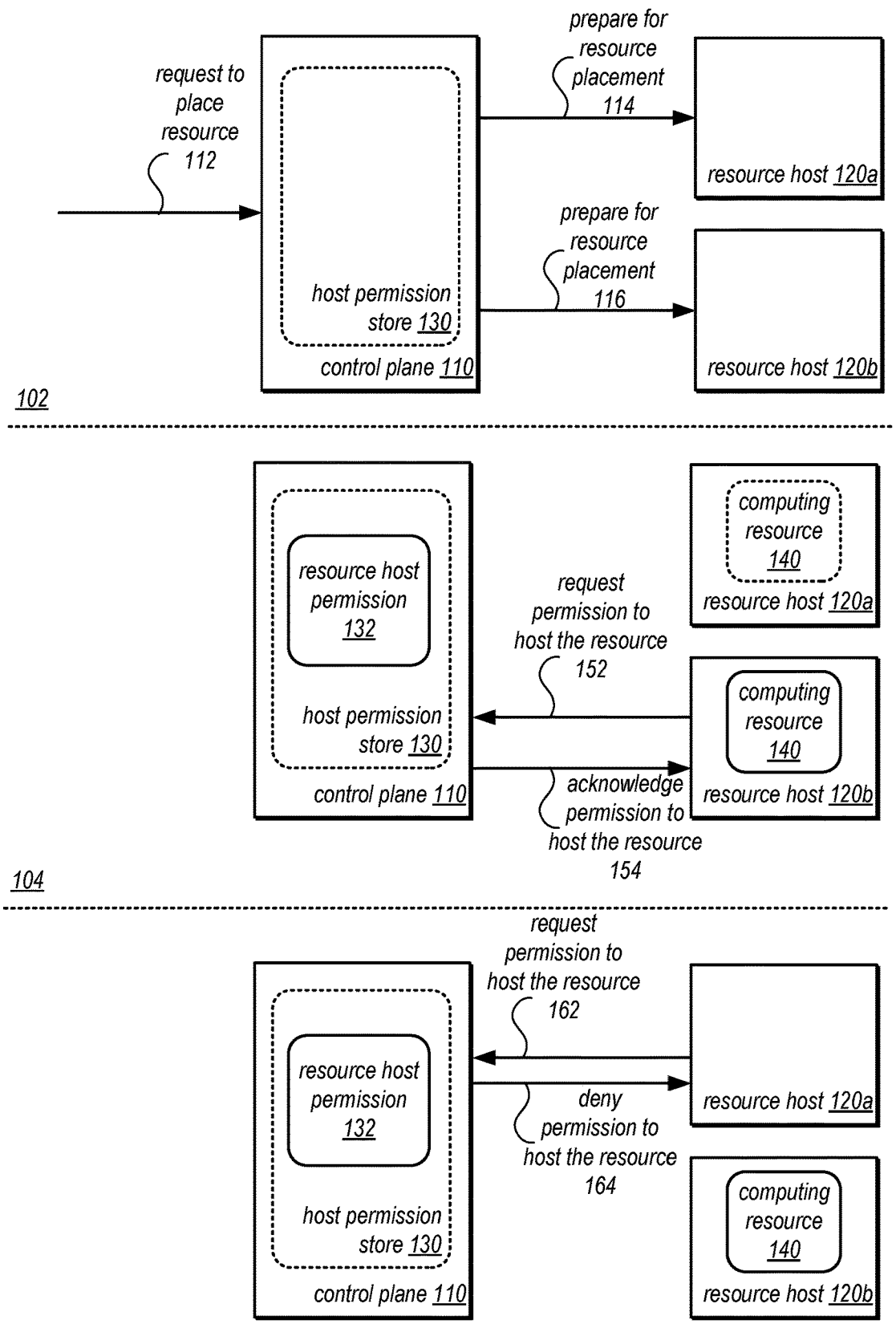
FIG. 1 illustrates a logical block diagram for optimistically granting permission to host computing resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement optimistically granting permission to host computing resources. Distributed systems may host various resources for performing or implementing different systems, services, applications and/or functions. Some resources may be part of a larger distributed resource, located at multiple resources amongst different resource hosts. Other resources may be individual or stand-alone. Resources may be one of many different types of resources, such as one of various types of physical or virtualized computing resources, storage resources, or networking resources. For example, a storage service may host different replicas of data across a number of different resource hosts.

Placement decisions may be made according to placement criteria, in some embodiments. Placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., different infrastructure zones such as network router or brick). If no such location is available, then the placement criteria may indicate a less optimal location to place the resource (e.g., a resource host that is in a less efficient infrastructure zone, such as a different network router or brick than another resource with which the placed resource communicates). Placement criteria may include, but are not limited to, a configuration of the resource along with other resources if part of a distributed resource, available bytes, IOPs, or slots, a resource utilization balance, such as bytes to IOPs balance, impact on capacity fragmentation, hardware/software characteristics, and/or various desired location-based configurations.

Placement permissions may allow for concurrent performance of resource creation workflows so that a resource host that can quickly prepare to host a resource can be identified, in some embodiments. Large scale distributed systems that host hundreds, thousands, or millions of resources, for example, may initiate placement of a resource at multiple locations in order to find the quickest available or best suited location for a resource, in some embodiments. Optimistically granting permission to host computing resources may improve the speed at which permission may be granted, in such scenarios, reducing the amount of time clients, applications, or users wait to have their resource placed and created, because a lesser number of interactions may be dependent upon a control plane or other permission granting authority to proceed. The cost savings introduced by optimistically granting permission, for instance, may significantly reduce placement time for individual resources (e.g., because resource hosts are not waiting on the control plane or other permission authority to proceed with tasks to prepare to host the resource). In some embodiments, optimistically granting permission to host computing resources may reduce the workload of the control plane or other permission granting authority overall (further improving placement performance), in some embodiments. For example, if the control plane or permission authority has a relatively small number of resources to perform control plane or blessing operations (e.g., tens of servers) and resource hosts in the resource plane (e.g., a data plane) use a large number of resources (e.g., tens of thousands), then the control plane resources can quickly become a bottleneck to placement and/or other control plane operations, which optimistically granting permission to host computing resources can alleviate.

FIG. 1 illustrates a logical block diagram for optimistically granting permission to host computing resources, according to some embodiments. Control plane 110 may direct the placement of computing resources at various resources hosts 120. Resource hosts 120, which may be one or more computing systems, nodes, or devices (e.g., system 1000 in FIG. 9 below) may be configured to host or implement a resource of the distributed system. Resource hosts 120 may be separate from (e.g., over a network connection) from applications, clients, or users of the resources hosted at resource hosts 120.

As illustrated in scene 102, a request to place a resource 112 may be received at control plane 110. The request 112 may include various information about the resource to be placed, including configuration information for any potential resource host 120 that will host the resource (or may include information that can identify default configuration parameters or other information for performance requirements or qualifications of a resource host 120). As illustrated in scene 102, control plane 110 may send requests, such as requests 114 and 116, to multiple resource hosts, such as resource hosts 120a and 120b, to prepare to host the resource, in some embodiments. For example, the requests may include information to initiate, prepare, and/or otherwise configure resources hosts 120 for the resource (e.g., setting up network configuration, installing applications, removing old data, etc.). The requests to prepare can be sent to many resource hosts, in parallel, groups, or according to a priority ordering, in some embodiments. In this way, preparation requests can be sent in order to maximize the chance of a quick preparation phase for placing a resource at one (or more) hosts 120, in some embodiments.

As illustrated in scene 104, resource host 120b may request permission to host the resource 152 from control plane 110. As discussed below with regard to FIGS. 6 and 7, control plane 110 may optimistically grant the request and store a resource host permission indication 132 in host permission store 130. For example, an optimistic locking mechanism or other technique for identify, storing, and preserving the granted permission for one resource host to host the Control plane 110 may then acknowledge permission to host the resource to resource host 120b, which may finalize and make computing resource 140 available.

Figure 7:
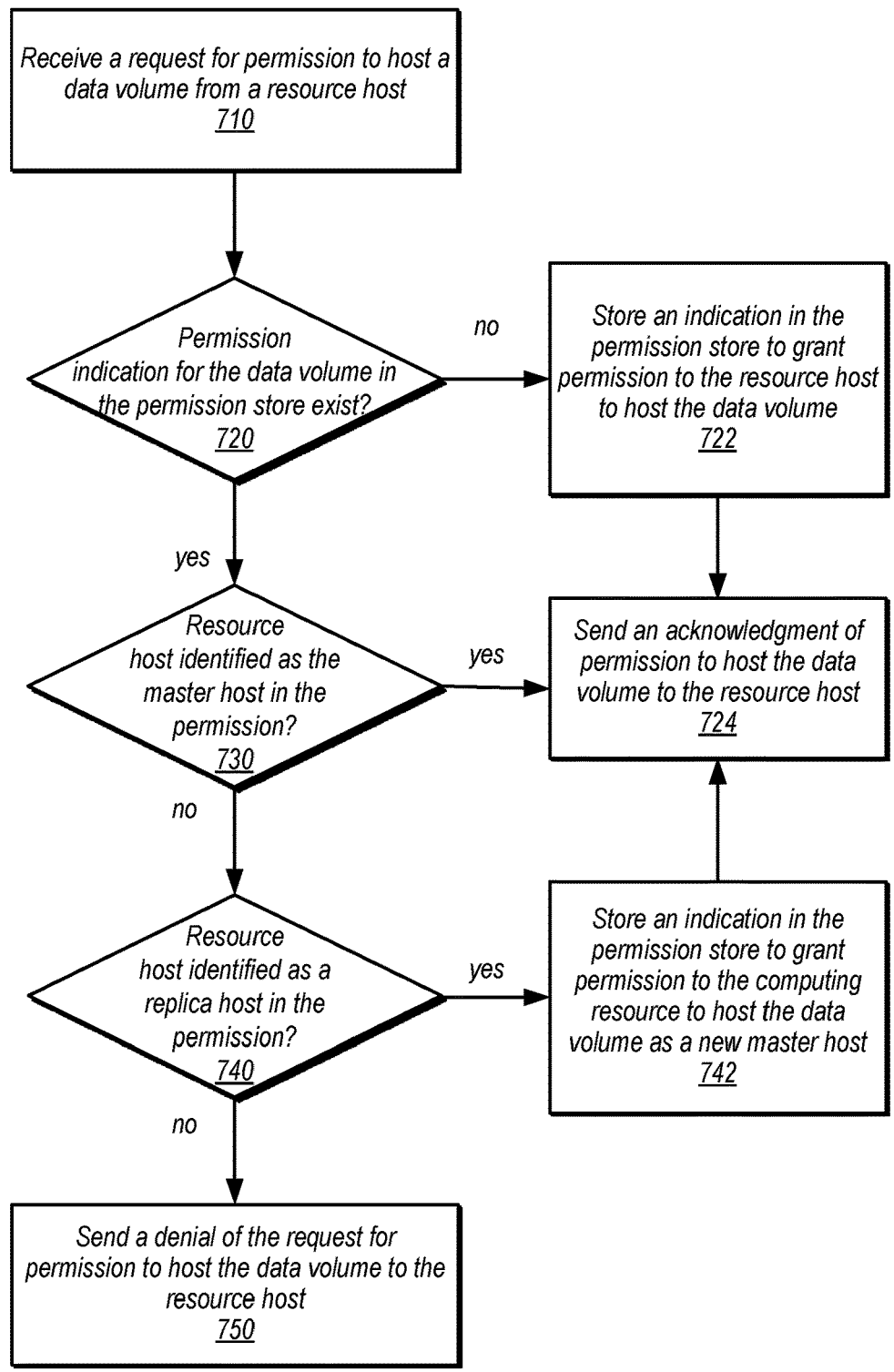
FIG. 7 is a high-level flowchart illustrating various methods and techniques for evaluating requests for permission to host a data volume from resources hosts, according to some embodiments.

As illustrated in scene 106, resource host 120a may attempt to request permission to host the request 162. Control plane 110 may deny permission 164 to resource host 120a as host permission store 130 indicates that permission was already granted to resource host 120b. For example, control plane 110 may perform a permission grant check or other evaluation according to how the permission indication 132 is represented in host permission store 130 in order to determine that the request for permission should be denied. FIG. 7, discussed below, provides further examples of the analysis for determining whether to grant or deny a permission request that may be implemented, in some embodiments.

Please note that previous descriptions are not intended to be limiting, but are merely provided as an example of optimistically granting permission to host computing resources. Various components may perform resource placement and/or permission granting. Different numbers or types of resources and permission data may be employed.

This specification begins with a general description of a provider network, which may implement optimistically granting permission to host computing resources offered via one or more network-based services in the provider network, such as optimistically granting permission to host data volumes offered via a block-based storage service. Then various examples of a block-based storage service are discussed, including different components/modules, or arrangements of components/module that may be employed as part of volume placement for data volumes in the block-based storage service. A number of different methods and techniques to implement optimistically granting permission to host computing resources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
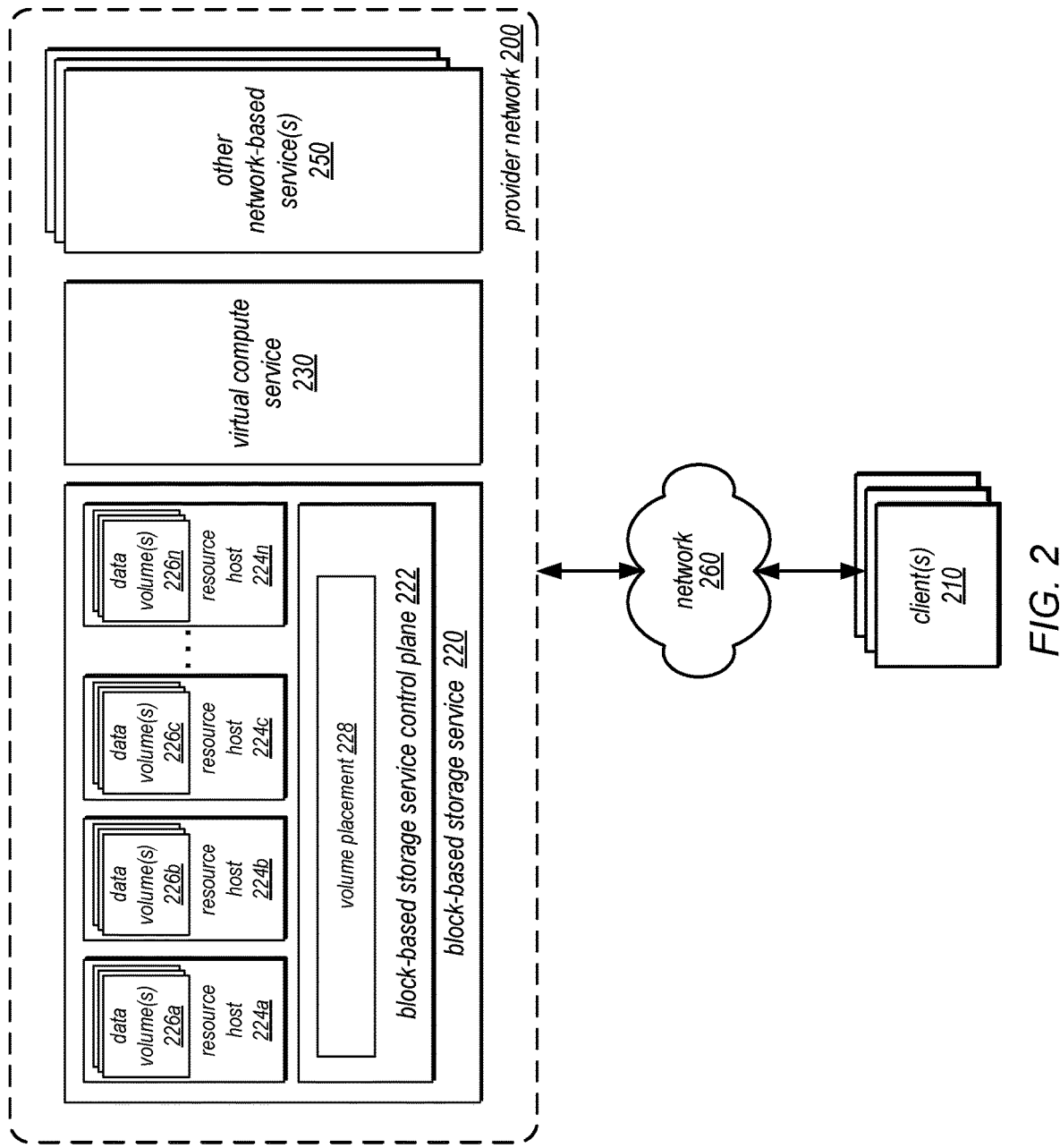
FIG. 2 is a block diagram illustrating a provider network that includes multiple network-based services such as a block-based storage service that implements optimistically granting permission to host computing resources, according to some embodiments.

FIG. 2 is a block diagram illustrating a provider network that includes multiple network-based services such as a block-based storage service that implements optimistically granting permission to host computing resources, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may provide computing resources, such as virtual compute service 230, storage services, such as block-based storage service 220 and other storage service (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances. Although the discussion that follows describes the placement of resources in terms of data volumes offered by block-based storage service 220, similar techniques could be implemented for other computing resources hosted or offered by other services, such as compute instance offered by virtual computer service 230, in some embodiments.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service.

Figure 9:
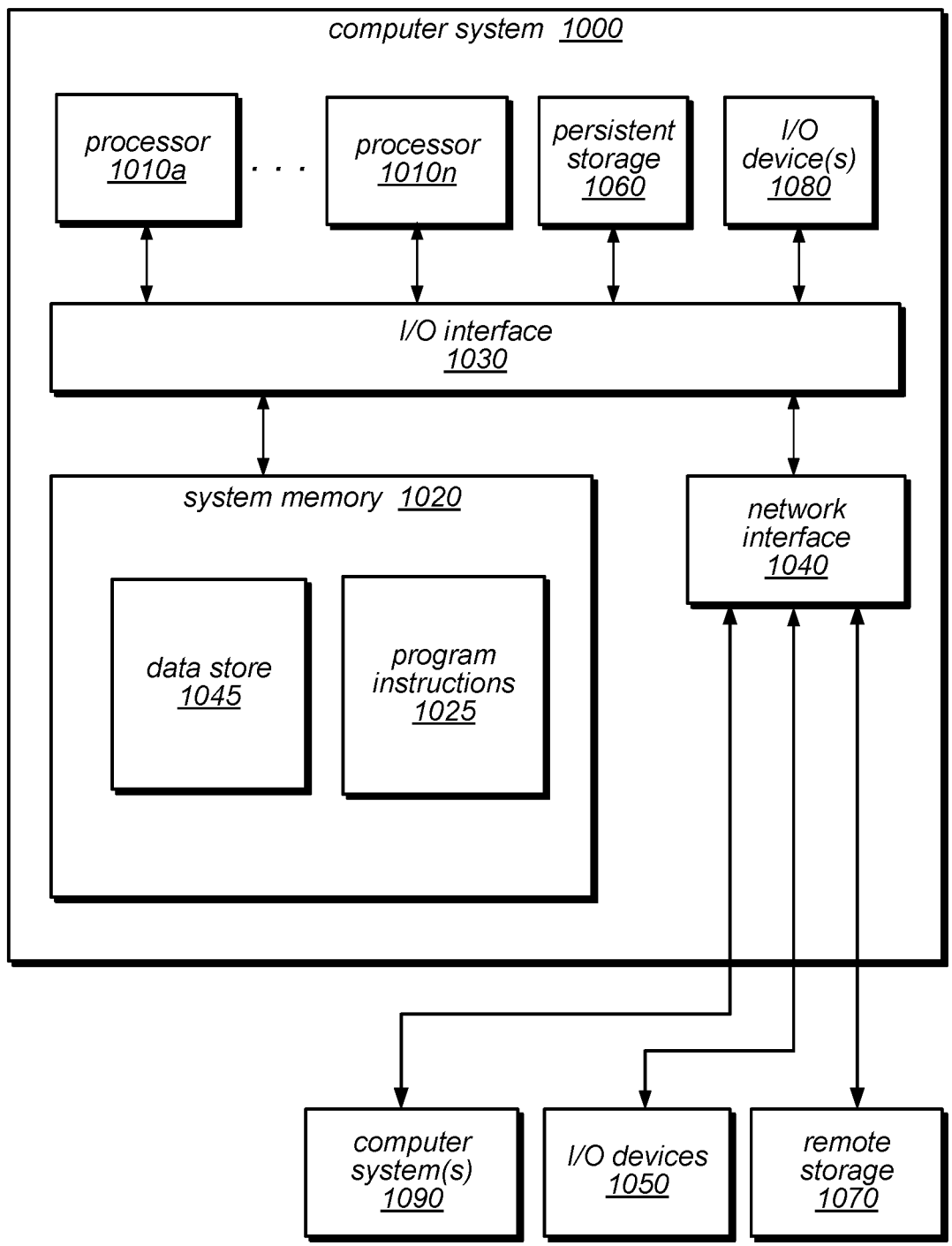
FIG. 9 is a block diagram illustrating an example computing system, according to some embodiments.

A resource host 224 may be one or more computing systems or devices, such as a storage server or other computing system (e.g., computing system 1000 described below with regard to FIG. 9). Each resource host 224 may maintain respective replicas of data volumes. Some data volumes may differ in size from other data volumes, in some embodiments. Resource hosts 224 may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as replica resource hosts. Thus, when a write request is received for the data volume at a master resource host, the master resource host may forward the write request to the replica resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master (or leader, coordinator, or primary host/replica) and replica resource hosts (e.g., secondary, worker, or slave hosts) may be assigned per data volume. For example, for a data volume maintained at one resource host, the resource host may serve as a master resource host. While for another data volume maintained at the same resource host, the resource host may serve as a replica resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a resource host (and replicas of data volumes implemented on the resource host) may be within multiple different types of infrastructure zones, such as a particular network router or brick, a particular room location, a particular site, etc.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane 222 may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service (e.g. as one of other network-based storage service(s) 250), as noted above. The other storage service may provide a same or different type of storage as provided by block-based storage service 220. For example, in some embodiments the other storage service may provide an object-based storage service, which may store and manage data as data objects. For example, volume snapshots of various data volumes 226 may be stored as snapshot objects for a particular data volume 226. In addition to another storage service, provider network 200 may implement other network-based services 250, which may include various different types of analytical, computational, storage, or other network-based system allowing clients 210, as well as other services of provider network 200 (e.g., block-based storage service 220, virtual compute service 230) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
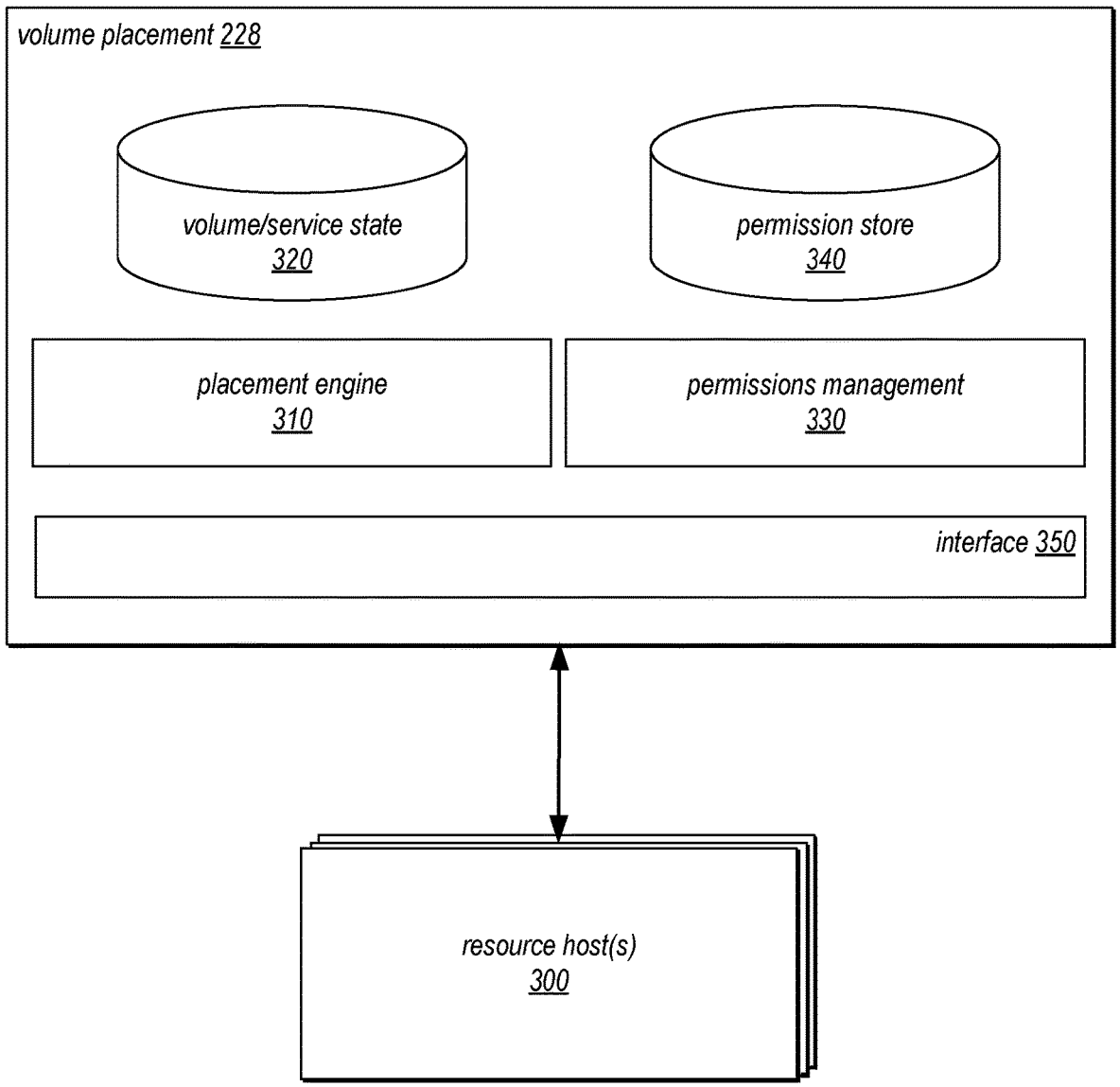
FIG. 3 is a logical block diagram illustrating volume placement that implements optimistically granting permission to host computing resources, according to some embodiments.

Block-based storage service control plane 222 may implement volume placement 228, in various embodiments. FIG. 3 is a logical block diagram illustrating volume placement that implements optimistically granting permission to host computing resources, according to some embodiments. As noted above, multiple resource hosts, such as resource hosts 300, may be implemented in order to provide block-based storage services. Volume placement 228 may be implemented at one or more computing nodes, systems, or devices (e.g., system 1000 in FIG. 9). In at least some embodiments, volume placement 228 may implement placement data collection to collect information, metrics, metadata, or any other information for performing volume placement. Placement data collection may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, placement data collection may aggregate the data according to infrastructure zones, partitions, resource hosts, or other granularities for block-based storage service 220. Placement data collection may store the data at volume/service state store 320, which may persistently maintain the collected data. In some embodiments volume/service state store 320 may be implemented as a database or otherwise searchable/query-able storage system to provide access to other components of volume placement 228 or block-based storage service control plane 226.

Volume placement 228 may implement placement engine 310, in various embodiments. Placement engine 310 may perform various kinds of analysis to identify placement locations for resources, such as replicas of new data volumes or migrating currently placed data volumes. Analysis may be performed with respect to the placement criteria, discussed above, to determine placement locations which may be optimal for individual resources, or for the block-based storage service as a whole. For instance, placement engine 310 may implement configuration analysis to evaluate prospective placement configurations of all of the resources in a distributed resource, such as the placement of master, replica(s) of a data volume. In some embodiments, a client or other user of a distributed resource (or resource of the distributed resource) may be considered in the configuration analysis (e.g., evaluating the placement configuration including a virtual instance attached to a data volume). Configuration analysis may consider the impact of migrating currently placed resources to other resource hosts in order to free up space at resource hosts that would provide better configurations for other resources of a distributed resource. For example, this could include moving a replica volume (e.g., the resource) to another resource host to make room for a different replica volume at that host, which would make the different replica volume in the same infrastructure zone as a master of the volume or a client of the volume. In some circumstances, this configuration (e.g., having the master or replica volume in the same infrastructure zone, such as being connected to the same network router, as the client) provides improved performance and may be an optimal configuration.

In response to receiving a placement request at placement engine 310, configuration analysis may determine prospective placements by accessing volume/service state 320. Those resource hosts which are available, and which do not violate any placement constraints may be evaluated (e.g., two partitions of a data volume cannot be hosted by the same resource host, resource hosts with enough capacity, or resource hosts that implement particular hardware and/or software). In some embodiments, a subset of available resource hosts may be evaluated for placement decisions (as evaluating a very large pool of available resource hosts may be too computationally expensive). Prospective placement configurations may be generated or identified based on the available resource hosts for the resource. Other replicas of the data volume may be evaluated based on actual or hypothetical placement locations.

One or more infrastructure zone localities may be determined for the different prospective placement configurations of a distributed, in various embodiments, based on volume/service state 320. For instance, metadata may indicate which network bricks or routers the resource hosts of different replicas of a data volume are connected to. In at least some embodiments, a score may be generated for the infrastructure zone locality of a prospective placement configuration (where the resource to be placed is located at a different available resource host). Placement engine 310 may perform configuration analysis upon many other metrics, data, or considerations besides infrastructure zone localities. For example, in at least some embodiments, an analysis may be performed on prospective configurations with respect to different performance metrics of the resource hosts hosting the replicas of a data volume. For example, storage capacity, workload, or Input/Output Operations per second (IOPs), may be evaluated for the data volume as a whole. Some data volumes may be partitioned so that different partitions maintain different portions of data for a data volume. For example, a data volume may be partitioned into 3 sets of master-replica replica pairs. Configuration analysis may be performed based on the placement configuration for each portion of the data volume that is replicated (e.g., each master-replica replica pair) or all of the data volume partitions (e.g., all 3 of the master-replica replica pairs).

Placement engine 310 may implement other analysis to determine partition placements. For example, scores may be generated for placements based on the last time a particular resource host was contacted or heard from. Analysis may be performed to identify and prevent multiple master-replica replica pairs from being placed on the same two resource hosts. In some embodiments, resource host fragmentation analysis may be performed, to optimize placement of resources on resource hosts that can host the partition and leave the least amount of space underutilized. As with configuration analysis above, the example analysis given above may be performed to determine placement locations for some resources which if migrated would provide better placement of other resources that were not moved.

In some embodiments, volume placement 228 may implement a migration manager (not illustrated). The migration manager may dynamically or proactively migrate currently placed resources (e.g., volume replicas) from one resource host to another resource host so that the placement for the resource (e.g., data volume) is more optimal and/or placement of resources amongst the resource host(s) 310 is more optimal as a whole (even if the migration results in a same or less optimal new placement for the migrated resource).

In at least some embodiments, volume placement 228 may implement permissions management 330 for granting or denying permission to resource hosts to host data volumes, as discussed in detail below with regard to the techniques of FIGS. 4-7. Permission store 340 may be implemented as a database or otherwise searchable/queryable storage system to provide access to other components of volume placement 228 or block-based storage service control plane 226 to store records, entries, or permissions of resource hosts to host data volumes, as discussed below. Note, however, that in other embodiments, permissions management 330 and/or permission store 340 may be implemented separately from volume placement 228 (e.g., as part of a separate control plane function or component hosted by different nodes or servers or as a separate service that manages permissions for hosted resources separately from the services hosting the resources).

Figure 4:
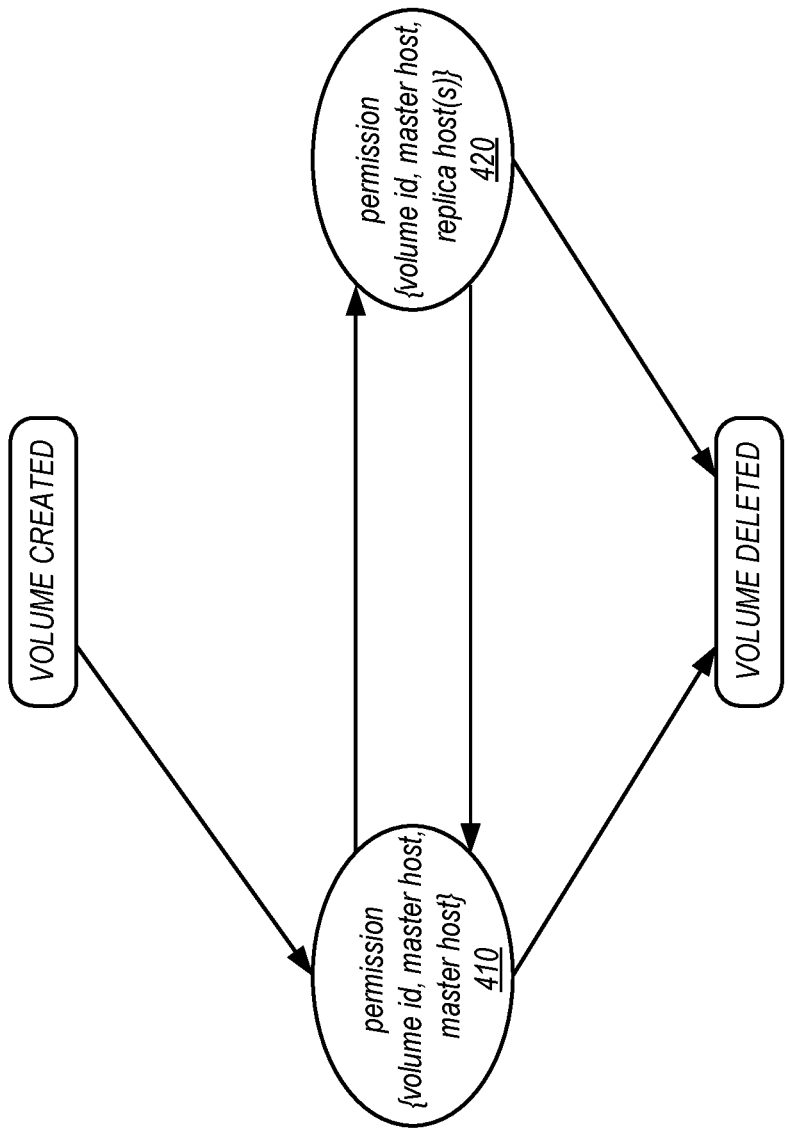
FIG. 4 is a state diagram illustrating changes to permissions to host computing resources, according to some embodiments.

FIG. 4 is a state diagram illustrating changes to permissions to host computing resources, according to some embodiments. Permission store 340 in FIG. 3 may, for instance, track various information about data volumes created and hosted in block-based storage service 220. The progression of the state of the data volumes may allow for the control plane to reason over various requests, including whether to grant permission to a resource host, as discussed in detail below with regard to FIG. 7. When a volume is created, there may be a time that it is being created before permission for the volume's host is granted, thus volume created is an initial state that may be transitioned from to a permission state 410 or 420. In some embodiments, permission may first be granted for a volume master. As indicated at 410, a permission indication for a successful resource host may identify the volume identifier (id), master host, as replica the same master host). The duplicative master identifier may be to indicate that the data volume operations in a solo mode (with no replicas) or that the master host has yet to obtain a replica host. Thus, state of the permission can transition from either 410 to 420 or to volume deleted (if the master never leaves solo mode before the volume is deleted.

As indicated by the path from permission 410 to 420, a second permission request to update or add the replica host(s) may be performed after the master is granted permission, in some embodiments. Both permissions 410 and 420 may transition to volume deleted, either as part of a volume deletion workflow by the control plane, as discussed below with regard to FIG. 8 and/or by a resource host indicating that the data volume is being deleted and updating the permission store record accordingly, in some embodiments. Please note that other information as part of a volume permission indication or state may be stored in addition to the information illustrated in FIG. 4. For example, a timestamp may be associated with a change in volume state so that a staleness check or other feature may be implemented based on the length of time a permission has been granted (e.g., in scenarios where permissions may have to be renewed periodically before becoming defunct).

Figure 5:
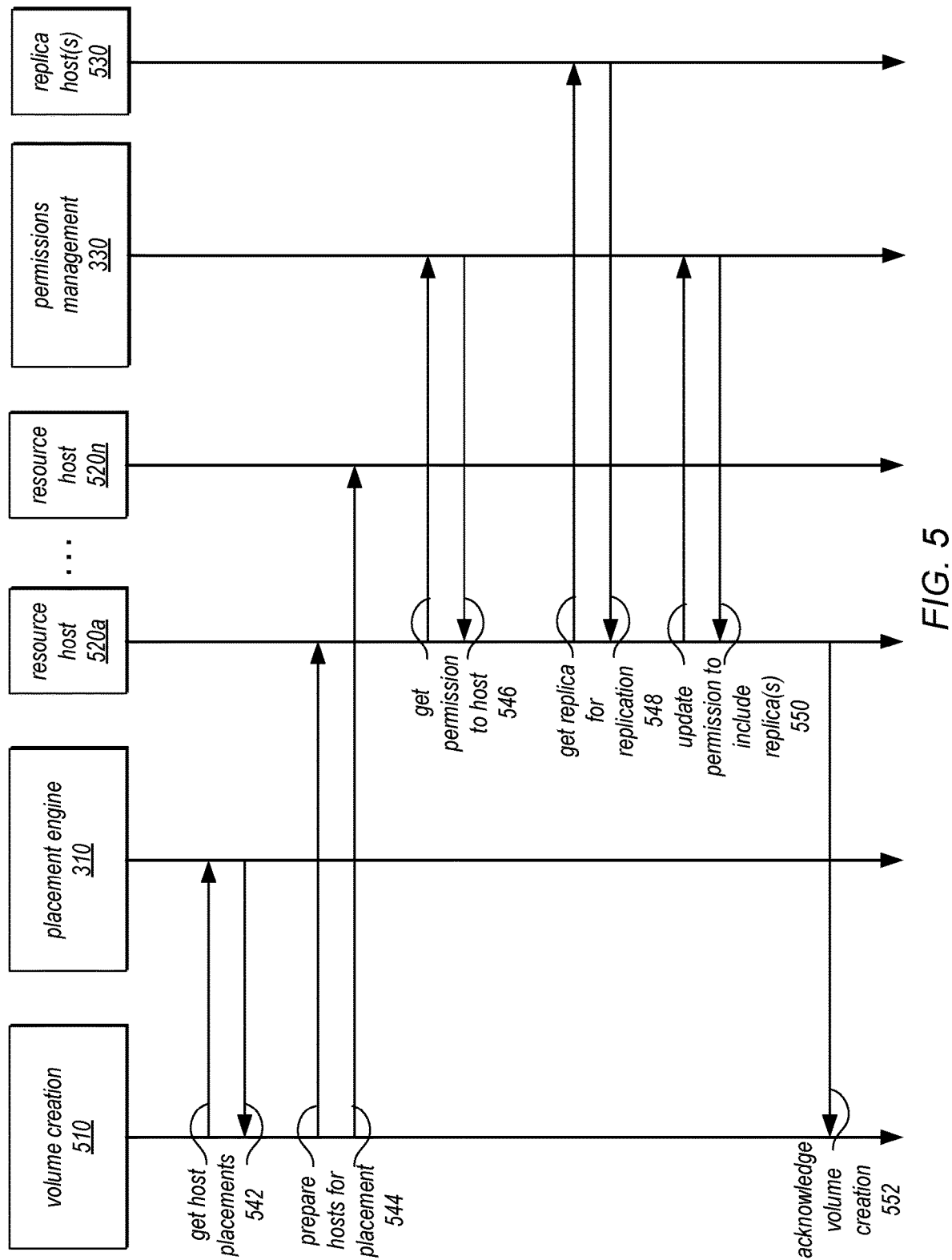
FIG. 5 is a logical block diagram illustrating interactions for optimistically granting permission to host computing resources, according to some embodiments.

FIG. 5 is a logical block diagram illustrating interactions for optimistically granting permission to host computing resources, according to some embodiments. Volume creation 510 may be implemented as part of a control plane 222 for block-based storage service 220, in some embodiments. Volume creation 510 may, for instance, handle requests from users or other systems to set up, launch, or otherwise create new data volumes to be hosted in block-based storage service 220, in some embodiments.

Volume creation 510 may get host placements 542 from placement engine 310, discussed above with regard to FIG. 3. In some embodiments, placement engine 310 may provide a collection or group of resource hosts to as (e.g., in parallel batches—or as a whole—, or according to an ordered or prioritized list of placements so that volume creation attempts to place a data volume in an optimal location on a resource host). For example volume creation may send multiple requests 544 to prepare hosts for placement to resource hosts 520a through 520n. These requests may be staggered or sent according to a prioritized order, or may be sent together so that the first resource host ready can proceed to get permission to host the data volume, in some embodiments. In this way, the time spent waiting on trying out different resource hosts can be reduced if multiple preparation requests can be sent together or within a short period of time, in some embodiments.

Figure 6:
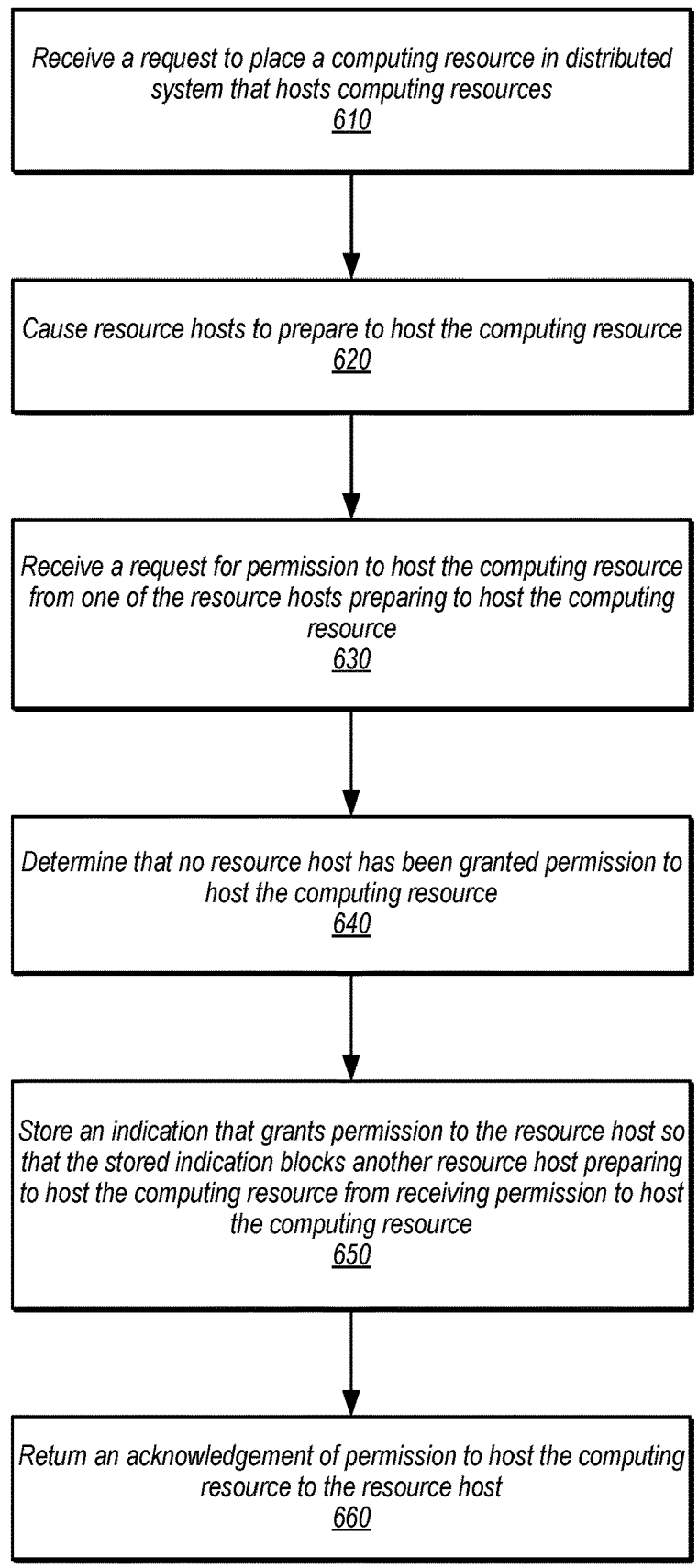
FIG. 6 is a high-level flowchart illustrating various methods and techniques for optimistically granting permission to host computing resources, according to some embodiments.

For example, resource host 520a may be the first resource host ready and may get permission to host the data volume 546 from permissions management 330 (e.g., which may evaluate the request according to the various techniques discussed below with regard to FIGS. 6 and 7). Once permission is obtained, resource host 520a may get 548 one or more replicas 530 to host a replica of the data volume in coordination with resource host 520a acting as the master replica for the data volume. Resource host 520a may then update permissions management 330 to include the replicas, as indicated at 550. Then, resource host 520a may provide an acknowledgement 552 to volume creation 510 that creation of the data volume is complete, in some embodiments.

The examples of opportunistic resource migration for resource placement discussed above with regard to FIGS. 2-5 have been given in regard to a block-based storage service and/or other network-based services. Various other types or configurations of distributed systems placing resources of distributed resources at resource hosts may implement these techniques. For example, a backup or archive distributed storage system may optimistically granting permission to host data backups or archives. Similar a virtual machine or virtual computer hosting service, such as virtual computing service 230 in FIG. 2 above may implement similar techniques to place resources (e.g., compute instances). Different configurations of the various modules, components, systems, and or services described above that may implement optimistically granting permission to host computing resources. FIG. 6 is a high-level flowchart illustrating various methods and techniques for optimistically granting permission to host computing resources, according to some embodiments. These techniques may be implemented using a control plane, placement manager or other component for placing resources at resource hosts in a distributed system, as described above with regard to FIGS. 2-5.

Resources may be one of many different types of resources, such as one of various types of physical or virtualized computing resources, storage resources, or networking resources. Some resources may be part of a group of resources that make up a distributed resource. For example, a data volume of the block-based storage service described above with regard to FIGS. 2-5 may be a distributed resource that is implemented as a master and one or more replicas.

As indicated at 610, a request may be received to place a computing resource in a distributed system that hosts computing resources, in various embodiments. For example, the request may be received from a user or client application via an interface (e.g., graphical user interface or console, programmatic interface such as an API, or a command line interface), in some embodiments. The request may identify the resource and may include various information specify a configuration, or other parameters for the operation and/or hosting of the computing resource at resource host.

As indicated at 620, resource hosts may be caused to prepare to host the computing resource, in some embodiments. For example, a request may be sent to resource hosts to start a workflow to prepare the resource host by obtaining data, modifying, or setting up hosting software, applications, drivers, or other components at the resource host for the computing resource. As discussed above, the request may include configuration information or other parameters which may be used as part of causing the resource hosts to prepare to host the computing resource, in some embodiments. In some embodiments, data may be obtained, such as a compute instance image, data to be hosted as part of the data volume, or data to implement or execute components for hosting the computing resources (e.g., obtaining the appropriate drivers, applications, or other software).

Once preparation for hosting a computing resource is complete (or at a stage identified for obtaining permission to host a computing resource, the resource hosts may attempt to gain permission to host the computing resource, in some embodiments. As indicated at 630 a request for permission to host the computing resource may be received from one of the resource hosts preparing to host the computing resource, in some embodiments. For example, a request may be formatted according to an API or other control plane interface and may be submitted to the appropriate permission granting components (e.g., to a network endpoint that load balances permission requests across a fleet of permission handling servers or nodes). The request may specify an identifier for the computing resource, in some embodiments. In some embodiments, the request may specify additional resource hosts to serve as replicas or other components for implementing the computing resource (e.g., as a cluster), in some embodiments.

As indicated at 640, a determination may be made that the resource host is a first computing resource to request permission for the computing resource or other determination that no resource host has been granted permission to host the computing resource, in some embodiments. For, example, as discussed above, a permission store may be maintained that identifies those resources and hosts that have been granted permission for the corresponding resource. Conditional writes, locks, or other features may be used (e.g., by having the requesting host first read a lock value then attempt to write a new lock value if the read lock value is still present in the store, in some embodiments). Once determined to be the first resource host to request permission, an indication that grants permission to the resource host so that the stored indication blocks another resource host preparing to host the computing resource for receiving permission to host the computing resource may be stored, in some embodiments.

For instance, a permission store as discussed above may be updated with a record or entry that specifies the identifier of the computing resource and the identifier of the resource host granted permission, in some embodiments. As discussed below with regard to FIG. 7 (and above with regard to FIGS. 1 and 5), the indication may be used when handling permission requests from other resource hosts to deny those resource hosts not already associated with the computing resource (e.g., not a current or former master for the resource or a replica host), in some embodiments.

An acknowledgement of permission to host the computing resource may be returned to the resource host, in some embodiments, as indicated at 660. The acknowledgement may trigger final operations to make the computing resource available for use by a client application or user. In some embodiments, further preparation operations, such as procuring additional hosts to serve with the resource host may be performed.

Computing resources may have different configurations for implementing the resource. In at least some embodiments, a computing resource, such as a data volume may utilize multiple hosts, such as a master host and replica hosts. In such scenarios, permission state may evolve and be granted as different requests for identifying the master and replica hosts are performed, as discussed above with regard to FIGS. 4 and 5. FIG. 7 is a high-level flowchart illustrating various methods and techniques for evaluating requests for permission to host a data volume from resources hosts, according to some embodiments. As indicated at 710, a request for permission to host a data volume from a resource host may be received, in some embodiments. The request may specify various features, such as the identifier and/or role of the resource host for the data volume.

As indicated at 720, if a permission indication in the permission store for the data volume does not exist, then as indicated at 722, a indication in the permission store may be stored to grant permission to the resource host to host the data volume (e.g., similar to the scenarios discussed above with regard to FIGS. 1 and 6. However, if a permission indication does exist in the permission store then various outcomes may be selected depending on the permission store and/or the identity of the requesting resource host.

For example, as indicated at 730 the requesting resource host may be identified as the master host in the permission indication, in some embodiments. The host identifier may, for instance, be compared with the identifier of the master in the permission indicator. If the resource host is identified as a master host in the permission, then as indicated at 724 an acknowledgement of the permission may be sent to the resource host to host the data volume, in some embodiments.

In another example, if the resource host is identified as a replica host in the permission indication in the permission store (e.g. as part of a previous request to grant to update the permission to include the replica host as discussed above with regard to FIG. 5), as determined at 740, then an indication in the permission store to grant permission to the resource host the data volume as a new master host may be stored, in some embodiments. In this way, replica hosts that are performing a failover operation to assume the mastership of a data volume can gain permission and begin acting in the master host role (e.g., to provide access to the data, reducing interruptions to client applications or systems that utilize the data volume).

If the resource host is not denied as a replica host or a master host for the data volume, then as indicated at 750, a denial of the request for permission to host the data volume may be sent to the resource host, in some embodiments. In this way, resource hosts that failed to be the first resource host to prepare to host the data volume, for instance, cannot overwrite or interrupt a successful preparation and grant of permission to host the data volume.

Figure 8:
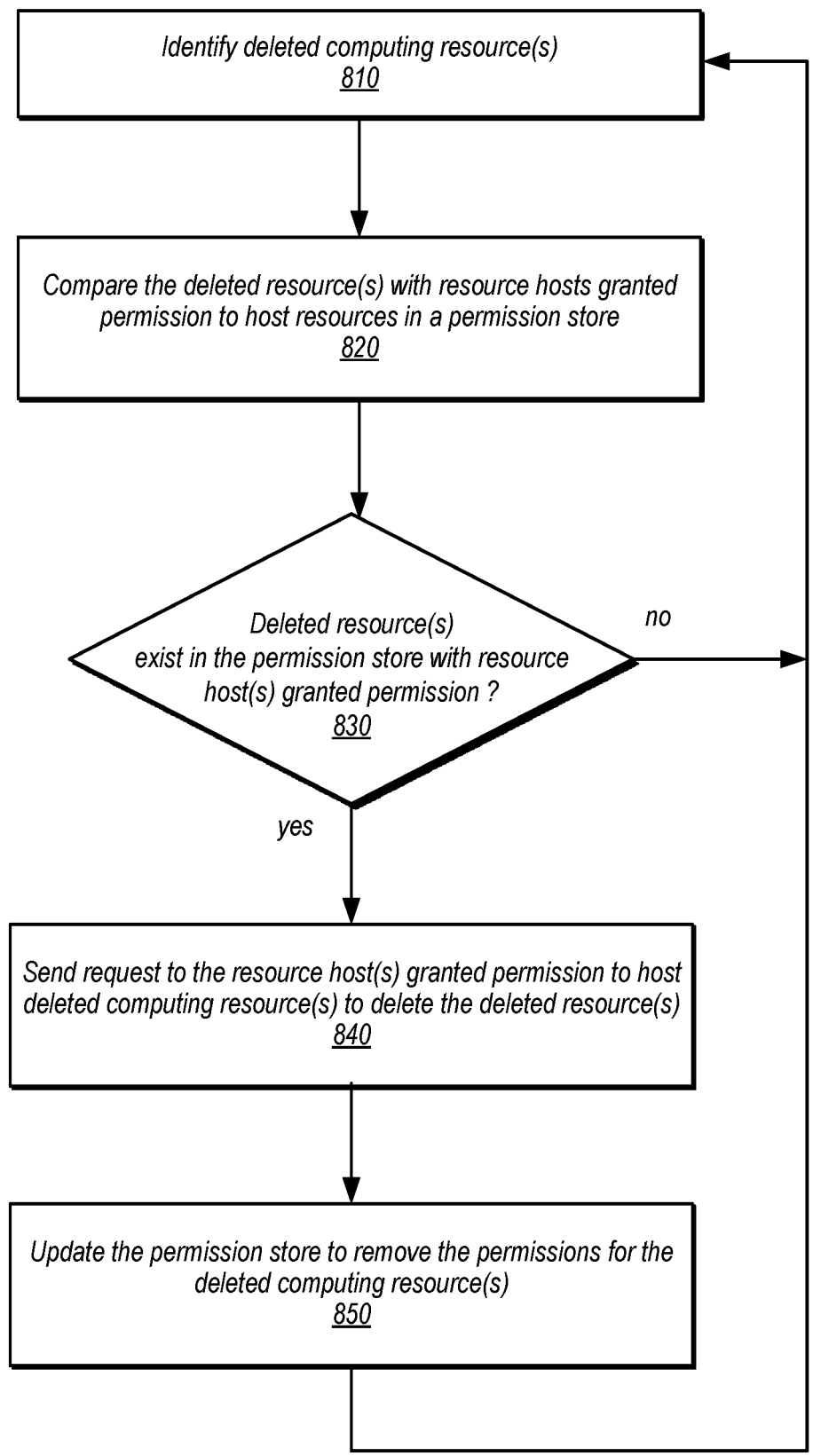
FIG. 8 is a high-level flowchart illustrating various methods and techniques for removing recorded permissions for deleted resources, according to some embodiments.

Optimistically granting permission to host computing resources may result in some computing resources being left online when they have been deactivated, removed, or otherwise deleted. FIG. 8 is a high-level flowchart illustrating various methods and techniques for removing recorded permissions for deleted resources, according to some embodiments. As indicated at 810, deleted computing resource(s) 810 may be identified according to some embodiments. For example, resource state information, such as volume state information discussed above with regard to FIG. 3, may be maintained as part of a control to support the performance of various control plane operations (e.g., performance statistics collections per resource, volume state (e.g., creating, active, deactived, deleted, etc.). An evaluation of the volume state may be made to determine a list of deactivated, removed, or otherwise deleted computing resources with the corresponding deleted state, in some embodiments.

As indicated at 820, the identified deleted resources may be compared with resource hosts granted permission to host resources in a permission store, in various embodiments. For example, computing resource identifiers that are deleted may be compared to computing identifiers of permissions. As indicated at 830, a determination may be made as to whether deleted resource(s) exist in the permission store with resource host(s0 granted permission to host the deleted resources. If not, as indicated by the negative exit from 830, the technique may be repeated, as discussed below. If yet, then as indicated at 830, a request to the resource host(s) with granted permission may be performed to inform them that the identified resources are to be deleted, as indicated at 840. In some embodiments, the resource hosts may have performed such a deletion. In some scenarios (e.g., when a failure occurs so that a resource host is down when a deletion request is received at the control plane from a user), the resource hosts may have not deleted the resources and thus may perform the deletion workflow, procedures, or other techniques to make the resource unavailable.

As indicated at 850, the permission store may be updated to remove the permissions for the deleted resources, in some embodiments. However, in other embodiments, the permission store may be updated to reflect that the resources are deleted so that no further permissions can be granted.

The techniques described in FIG. 8 may be performed repeatedly as indicated by the return arrows from elements 830 and 850, in some embodiments. Identification of resources may be triggered as an event (e.g., periodically triggered at certain intervals of time, after certain numbers of resources have been deleted since the last event, etc.). Ins some embodiments, the interval for identifying deleted computing resources may be dynamically determined (e.g., by analyzing time series data depicted resource events such as volume deletions to determine times when resources may be likely to remain active on storage nodes due to preservation of permissions in a permission store. In some embodiments, an event may be triggered when other control plane operations or workload falls below a threshold amount (e.g., below 20%).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of opportunistic resource migration for optimizing resource placement as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory storing program instructions that when executed by the at least one processor cause the at least one processor to implement a control plane to:
   in response to a request for hosting a computing resource, cause two or more of a plurality of resource hosts to prepare to host the computing resource;
   receive a request for permission to host the computing resource from one of the two or more resource hosts;
   evaluate a permission store to determine that the one of the two or more resource hosts is a first resource host to request permission for the computing resource;
   update the permission store to store an indication that grants permission to the one of the two or more resource hosts, wherein the stored indication blocks another one of the two or more resource hosts that requests permission to host the computing resource from the control plane from receiving permission to host the computing resource; and
   send an acknowledgement of permission to host the computing resource to the one of the two or more resource hosts.

2. The system of claim 1, wherein the program instructions further cause the at least one process to implement the control plane to:
   identify one or more deleted computing resources;
   compare the one or more deleted computing resources with resource hosts that are granted permission to host computing resources and associated with one or more indications in the permission store; and
   send a request to one of the resource hosts to delete one of the one or more deleted computing resources.

3. The system of claim 1, wherein the program instructions further cause the at least one processor to implement the control plane to:
   receive a request from the other one of the two or more resource hosts for permission to host the computing resource at the other one of the two or more resource hosts;
   evaluate the permission store to determine that the indication exists in the permission store granting permission to the one of the two or more resource hosts to host the computing resource; and
   send a denial of the request for permission to the other one of the two or more resource hosts.

4. The system of claim 1, wherein the computing resource is a data volume hosted in a block-based storage service, wherein the two or more resource hosts are caused to prepare to host the computing resource in response to a request for creating a new data volume at the block-based storage service that is received via an interface for the block-based storage service.

5. A method, comprising:
   receiving a request at a control plane for permission to host a computing resource from a resource host of a plurality of resource hosts;
   determining, by the control plane, that no resource host has been granted permission to host the computing resource;
   storing, by the control plane, an indication that grants permission to the resource host, wherein the stored indication blocks another resource host of the plurality of resource hosts that requests permission to host the computing resource from the control plane from receiving permission to host the computing resource; and
   returning, by the control plane, an acknowledgement of permission to host the computing resource to the resource host.

6. The method of claim 5, further comprising:
   receiving, by the control plane, a request from the other resource host of the plurality of resource hosts for permission to host the computing resource at the other resource host;
   determining, by the control plane, to deny the request received from the other resource host according to the indication that grants permission to host the computing resource to the resource host of the plurality of resource hosts; and
   sending, by the control plane, a denial of the request for permission to the other resource host.

7. The method of claim 6, wherein the computing resource is a data volume that is hosted at a master resource host and a replica resource host, wherein the resource host is the master resource host, and wherein determining according to the indication that grants permission to host the computing resource to the resource host comprises determining that the other resource host is not the replica resource host for the data volume.

8. The method of claim 5, wherein the computing resource is a data volume that is hosted at a master resource host and a replica resource host, wherein the resource host is the master resource host, and wherein the method further comprises:
   receiving, by the control plane, another request from the replica resource host for permission to host the computing resource at the replica resource host as a new master resource host; and
   responsive to a determination that the other request is from the replica resource host:
      granting, by the control plane, permission to the replica resource host to be the new master resource host; and
      returning, by the control plane, an acknowledgement to the replica resource host.

9. The method of claim 5, wherein the computing resource is a data volume that is hosted at a master resource host and a replica resource host, wherein the resource host is the master resource host, and wherein the method further comprises:
receiving, by the control plane, a request from the master resource host to add the replica resource host to the indication of permission; and
updating, by the control plane, the indication to include the replica resource host.

10. The method of claim 5, further comprising:
identifying, by the control plane, one or more deleted computing resources;
comparing, by the control plane, the deleted computing resources with resource hosts granted permission to host resources with one or more indications in the permission store; and
sending, by the control plane, a request to one of the resource hosts granted permission to host one of the deleted computing resources to delete the one deleted computing resource.

11. The method of claim 5, wherein the method further comprises:
receiving, by the control plane, a request to place the computing resource at one of the plurality of resource hosts; and
causing, by the control plane, two or more of the plurality of resource hosts to prepare to host the computing resource.

12. The method of claim 11, wherein causing the two or more of the plurality of resource hosts to prepare to host the computing resource comprises sending, by the control plane, parallel preparation requests to the two or more resource hosts.

13. The method of claim 11, wherein causing the two or more of the plurality of resource hosts to prepare to host the computing resource comprises sending, by the control plane, preparation requests to the two or more resource hosts according to a priority ordering for placing the computing resource.

14. A non-transitory, computer-readable storage medium, storing program instructions that when executed by one or more computing devices cause the one or more computing devices to implement:
receiving a request at a control plane for permission to host a computing resource from a resource host of a plurality of resource hosts;
evaluating, by the control plane, a permission store to determine that the resource host is a first resource host to request permission for the computing resource;
updating, by the control plane, the permission store to store an indication that grants permission to the resource host, wherein the stored indication blocks another resource host of the plurality of resource hosts that requests permission to host the computing resource from the control plane from receiving permission to host the computing resource; and
returning, by the control plane, an acknowledgement of permission to host the computing resource to the resource host.

15. The non-transitory, computer-readable storage medium of claim 14, wherein the program instructions cause the one or more computing devices to further implement:
receiving a request from the other resource host of the plurality of resource hosts for permission to host the computing resource at the other resource host;
determining according to the indication that permission to host the computing resource is granted to the resource host and not the other computing resource host; and
sending a denial of the request for permission to the other resource host.

16. The non-transitory, computer-readable storage medium of claim 14, wherein the computing resource is a data volume that is hosted at a master resource host and a replica resource host, wherein the resource host is the master resource host, and wherein the program instructions cause the one or more computing devices to further implement:
receiving another request from the resource host for permission to host the computing resource at the resource host;
determining according to the indication that the resource host is the master resource host for the data volume; and
sending an acknowledgement of permission to host the data volume to the master resource host.

17. The non-transitory, computer-readable storage medium of claim 14, wherein the program instructions cause the one or more computing devices to further implement:
receiving, by the control plane, a request to place the computing resource at one of the plurality of resource hosts; and
causing, by the control plane, two or more of the plurality of resource hosts to prepare to host the computing resource, wherein the resource host and the other resource host are included in the two or more resource hosts caused to prepare to host the computing resource.

18. The non-transitory, computer-readable storage medium of claim 17, wherein, in causing the two or more of the plurality of resource hosts to prepare to host the computing resource, the program instructions cause the one or more computing devices to implement sending, by the control plane, preparation requests to the two or more resource hosts according to a priority ordering for placing the computing resource.

19. The non-transitory, computer-readable storage medium of claim 14, wherein the program instructions cause the one or more computing devices to further implement:
identifying, by the control plane, one or more deleted computing resources;
comparing, by the control plane, the deleted computing resources with resource hosts granted permission to host resources with one or more indications in the permission store; and
sending, by the control plane, a request to one of the resource hosts granted permission to host one of the deleted computing resources to delete the one deleted computing resource.

20. The non-transitory, computer-readable storage medium of claim 14, wherein the computing resource is hosted in a network-based service offered by a provider network and wherein the program instructions cause the one or more computing devices to further implement receiving a request to create the computing resource at the network-based service via an interface for the network-based service.

* * * * *